United States Patent [19]
White, Jr. et al.

[11] Patent Number: 5,848,804
[45] Date of Patent: Dec. 15, 1998

[54] SIDE IMPACT AIR BAG MODULE

[75] Inventors: Michael J. White, Jr., Shelby Township; Robert F. McGee, Clawson; Steven W. Maurer, Clinton Township; Richard E. Shellabarger, Sterling Heights; Jeffrey C. Synor, Utica, all of Mich.

[73] Assignee: TRW Vehicle Safety Systems Inc., Lyndhurst, Ohio

[21] Appl. No.: 654,688

[22] Filed: May 29, 1996

[51] Int. Cl.$^6$ .................................................. B60R 21/20
[52] U.S. Cl. ...................................... 280/743.1; 280/730.2
[58] Field of Search .............................. 280/730.2, 743.1

[56] References Cited

U.S. PATENT DOCUMENTS 5,224,732  7/1993  Warner et al. ........................ 280/730
5,324,072  6/1994  Olson et al. ......................... 280/730.2
5,556,128  9/1996  Sinnhuber et al. ................... 280/730.2

*Primary Examiner*—Kenneth R. Rice
*Attorney, Agent, or Firm*—Tarolli, Sundheim, Covell, Tummino & Szabo

[57] ABSTRACT

A side impact air bag module (10) includes an air bag (30) and an inflator (32) which is actuatable to provide inflation fluid for inflating the air bag. The air bag (30) includes first and second main body portions (70, 120) and a first retainer portion (80) which is disposed between the first and second main body portions. The first retainer portion (80) and the first main body portion (70) of the air bag (30) at least partially define a pocket (200) in the air bag in which the inflator (32) and a diffuser (34) are disposed. Stitching sections (182b, 184b) close two sides of the pocket (200).

19 Claims, 3 Drawing Sheets

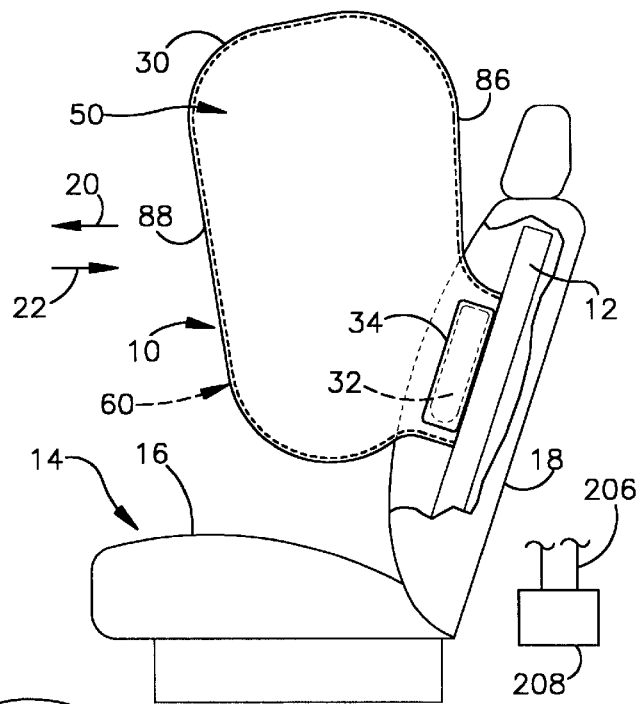
Fig.1
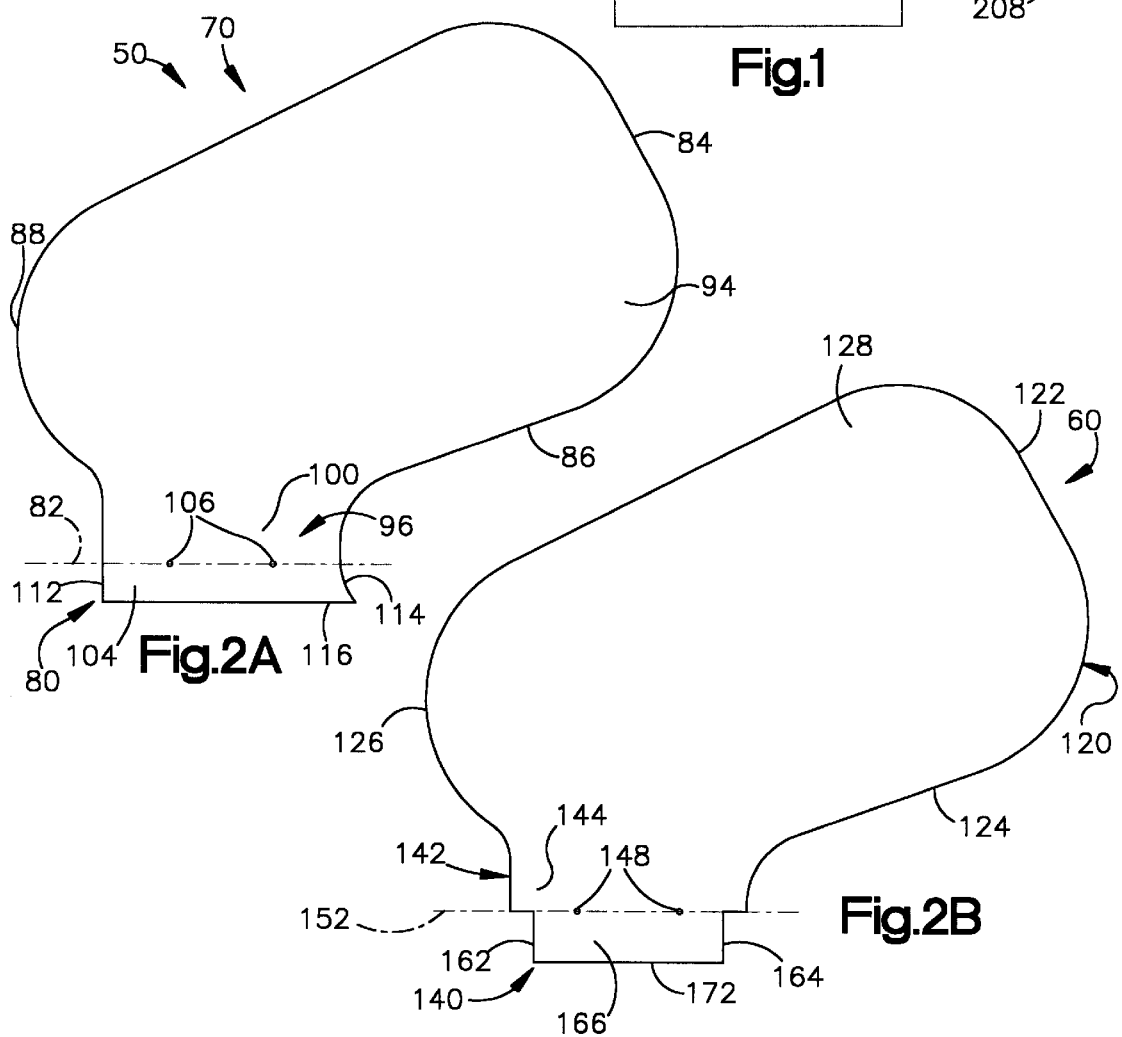

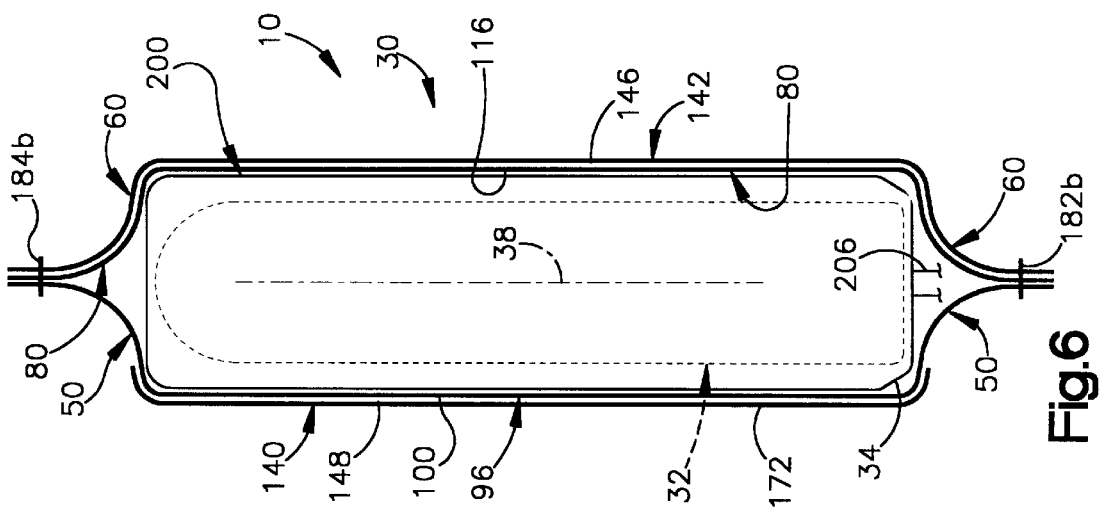
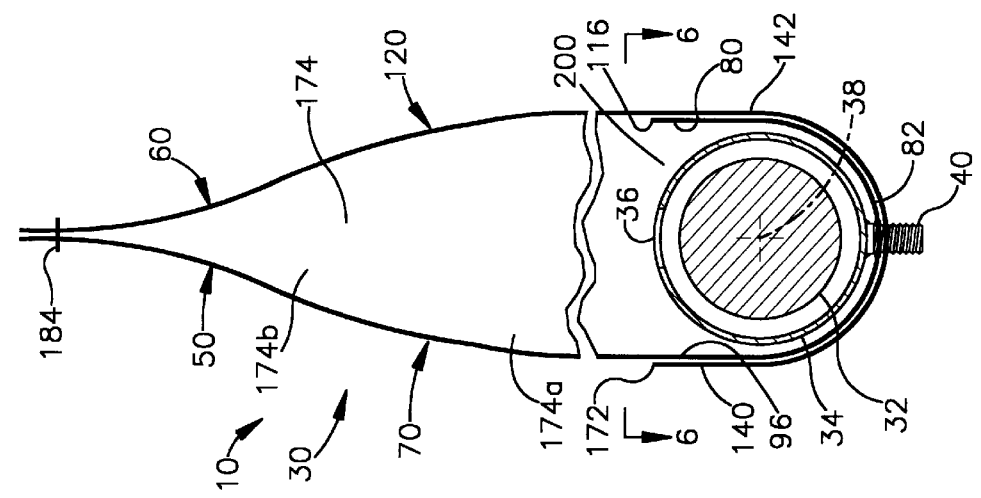
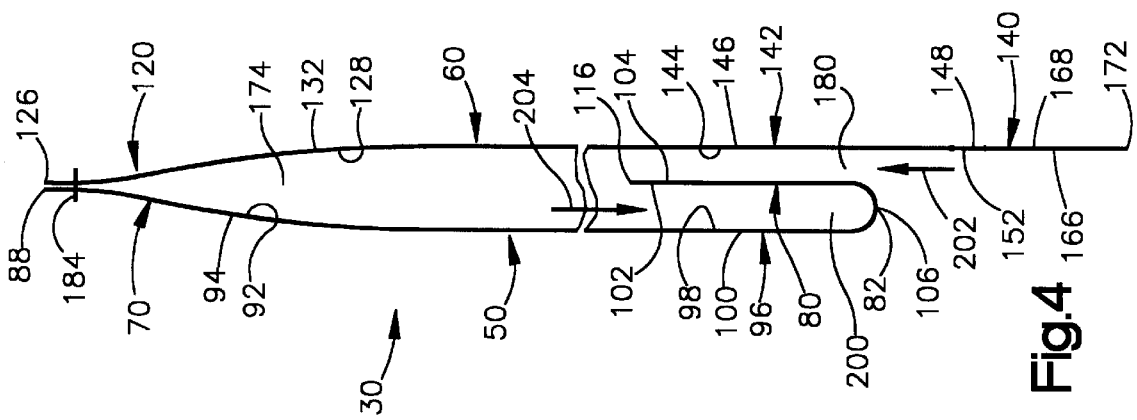

5,848,804

SIDE IMPACT AIR BAG MODULE

BACKGROUND OF THE INVENTION

1. Technical Field

The present invention relates to a vehicle safety apparatus and, in particular, relates to an air bag module including an inflatable vehicle occupant protection device, such as an air bag, for helping to protect a vehicle occupant in the event of an impact to the vehicle.

2. Description of the Prior Art

It is known to inflate an air bag to help protect a vehicle occupant in the event of a side impact to a vehicle of a magnitude above a predetermined threshold. The air bag is stored in a deflated condition, together with an inflator, in a portion of the vehicle such as a vehicle seat. The vehicle seat is disposed adjacent to side structure of the vehicle, such as a door, window, or body panel of the vehicle. In the event of an impact, such as a side impact, to the vehicle of a magnitude above the predetermined threshold, the inflator is actuated, and the air bag is inflated into a position between the vehicle occupant in the vehicle seat and the adjacent side structure of the vehicle. The air bag helps protect the vehicle occupant from forcefully being struck by parts of the side structure of the vehicle. The air bag can also help protect the vehicle occupant from objects which might intrude into the vehicle, such as a pole or a tree, during the side impact.

SUMMARY OF THE INVENTION

The present invention is a vehicle safety apparatus for helping to protect an occupant of a vehicle seat in the event of a side impact to the vehicle. The apparatus comprises an inflatable occupant protection device having a deflated condition and being inflatable into a position between the side structure of the vehicle and the vehicle occupant for helping to protect the vehicle occupant. The apparatus also includes an inflator which is actuatable to provide inflation fluid for inflating the inflatable device. The inflatable device includes first and second main body portions and a first retainer portion which is disposed between the first and second main body portions. The first retainer portion and the first main body portion of the inflatable device at least partially define a pocket in the inflatable device in which the inflator assembly is disposed.

In a preferred embodiment, the safety apparatus includes means for connecting the inflatable device and the inflator with the vehicle seat.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 1 is a schematic side elevational view of a vehicle seat and an air bag module constructed in accordance with the present invention, showing the air bag in an inflated condition;

FIG. 2A is an elevational view of an inner panel which forms a part of the air bag of FIG. 1;

FIG. 2B is an elevational view of an outer panel which forma a part of the air bag of FIG. 1;

FIG. 4 is a schematic sectional view taken along line 4—4 of FIG. 3;

FIG. 5 is a view similar to FIG. 4 showing an inflator assembly together with the air bag; and FIG. 6 is a view taken along line 6—6 of FIG. 5.

DESCRIPTION OF PREFERRED EMBODIMENTS

Figure 3:
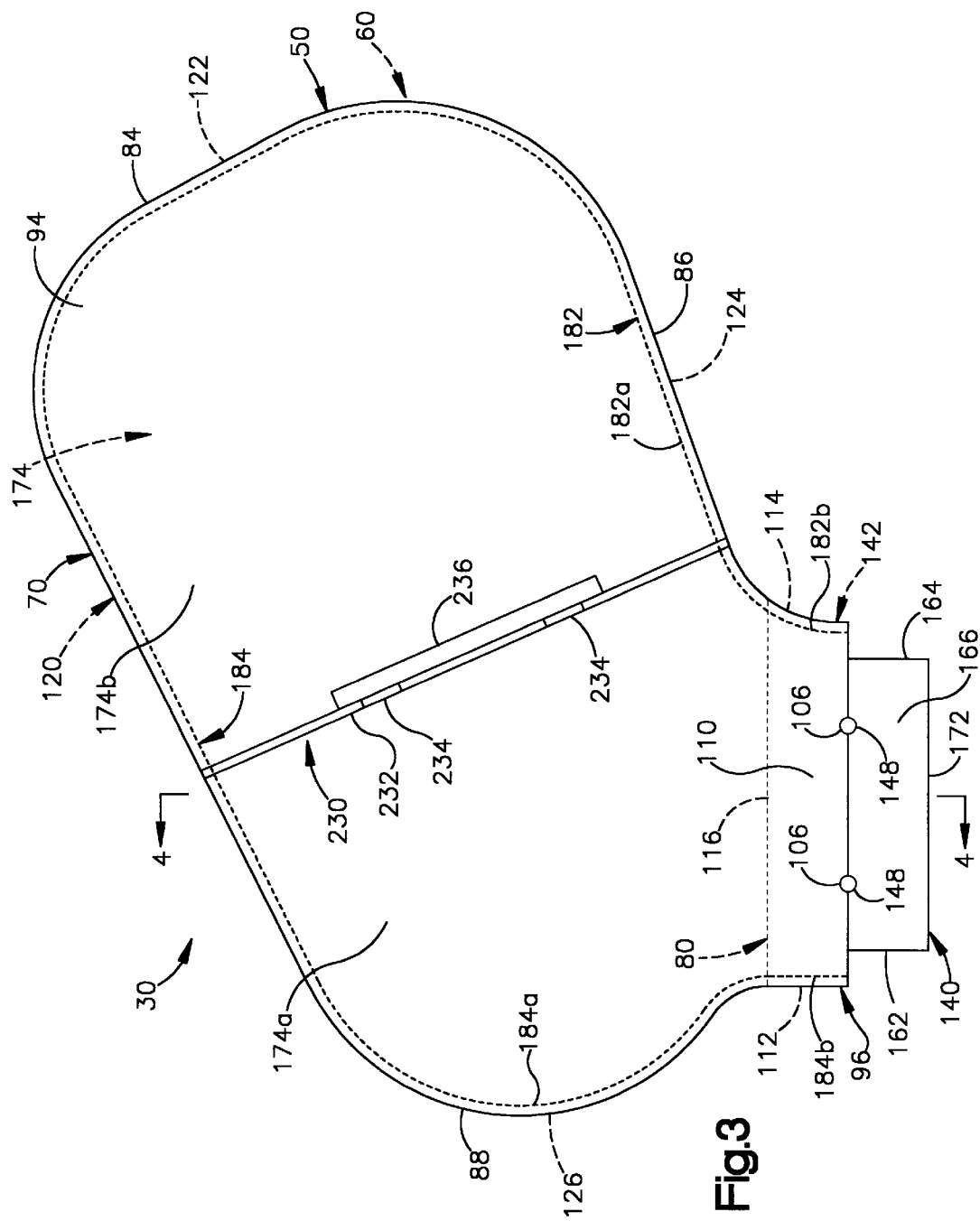
FIG. 3 is an elevational view of the air bag of FIG. 1 in a partially assembled condition.

The present invention relates to a vehicle safety apparatus and, in particular, relates to an air bag module including an inflatable vehicle occupant protection device, such as an air bag, for helping to protect a vehicle occupant in the event of a side impact to the vehicle. The present invention is applicable to various vehicle safety apparatus constructions. As representative of the present invention, FIGS. 1–3 illustrate a vehicle safety apparatus or air bag module 10.

The air bag module 10 is connected with a seat frame member 12 of a seat 14 for an occupant of a vehicle. The seat 14 includes a seat bottom cushion 16 and a seatback 18 connected with the seat bottom cushion. The seat frame member 12 is disposed in the seatback 18. A forward direction in the vehicle is indicated by the arrow 20 (FIG. 1) and a rearward direction in the vehicle is indicated by the arrow 22.

The air bag module 10 includes a particular type of inflatable device 30 which is commonly known as an air bag. The air bag 30 is described below in detail. The air bag module 10 also includes an inflator indicated schematically at 32 (FIGS. 1, 5 and 6). The inflator 32 preferably contains a stored quantity of pressurized inflation fluid and an ignitable material for heating the inflation fluid. The module 10 alternatively could include an inflator which uses the combustion of gas-generating material to generate inflation fluid in the form of gas to inflate the air bag 30, or an inflator which contains only a stored quantity of pressurized inflation fluid for inflating the air bag.

The air bag module 10 also includes a diffuser 34 (FIGS. 1, 5 and 6), which receives the inflator 32. The diffuser 34 is made from metal and has an elongate, cylindrical configuration. A series of fluid outlets 36 (FIG. 5) are formed in the diffuser 34 for directing inflation fluid to flow from the inflator 32 into the air bag 30. The fluid outlets 36 are arranged in a straight line which extends parallel to an axis 38 of the module 10. A plurality of mounting bolts 40 extend radially outward from the diffuser 34 opposite the outlets 36.

The air bag 30 is preferably made from a fabric material, such as woven nylon. The air bag 30 can alternatively be made from a non-woven material, such as plastic film. The use of plastic film, in particular, would require one or more inflation fluid vents to be formed in the air bag 30, as is known in the art. The air bag 30 (FIG. 2) is formed from two separate fabric material panels, that is, an inner panel 50 (FIG. 2A) and an outer panel 60 (FIG. 2B). The inner panel 50 is disposed closer to the vehicle occupant and the outer panel 60 is disposed closer to the side structure of the vehicle, when the air bag 30 is in the inflated condition shown in FIG. 1. The inner panel 50 and the outer panel 60 are sewn together in a manner described below to form the air bag 30.

The inner panel 50 (FIG. 2A) includes a main body portion 70 and a retainer portion 80 which lie on opposite sides of an imaginary line 82. In the illustrated embodiment, the main body portion 70 and the retainer portion 80 of the inner panel 50 are not separate pieces of material but are separate portions of the single piece of fabric material from which the inner panel 50 is made. The inner panel 50 could, alternatively, be made from a plurality of pieces of material which are interconnected, as by sewing, to form the inner panel.

The main body portion 70 of the inner panel 50 has a generally oblong configuration. A linear outer end portion 84 of the inner panel 50 merges with a first or upper (as viewed in FIG. 1) edge portion 86 and a second or lower (as viewed in FIG. 1) edge portion 88. The main body portion 70 of the inner panel 50 has opposite inner and outer side surfaces 92 (FIG. 4) and 94. An inner end portion or terminal end portion 96 (FIGS. 2A and 4) of the main body portion 70 of the inner panel 50 is disposed adjacent to the retainer portion 80. The inner end portion 96 has opposite inner and outer side surfaces 98 (FIG. 4) and 100 (FIG. 2A).

The retainer portion 80 of the inner panel 50 projects from the inner end portion 96 of the main body portion 70 of the inner panel 50. The retainer portion 80 has opposite inner and outer side surfaces 102 (FIG. 4) and 104. A pair of fastener openings 106 extend through the inner panel 50. The fastener openings 106 are centered on the imaginary line 82. The retainer portion 80 of the inner panel 50 has a linear first side edge 112 and an arcuate second side edge 114. A linear end edge 116 of the retainer portion 80 extends between the side edges 112 and 114.

The outer panel 60 of the air bag 30 is substantially similar to the inner panel 50. Specifically, the outer panel 60 includes a main body portion 120 which is identical in configuration to the main body portion 70 of the inner panel 50. The main body portion 120 of the outer panel 60 has a generally oblong configuration including an outer end portion 122 which merges with a first or upper (as viewed in FIG. 1) edge portion 124 and a second or lower (as viewed in FIG. 1) edge portion 126. The main body portion 120 of the outer panel 60 has opposite inner and outer side surfaces 128 and 132 (FIG. 4). A terminal end portion or inner end portion 142 of the main body portion 120 of the outer panel 60 has opposite inner and outer side surfaces 144 and 146 (FIG. 4).

A retainer portion 140 (FIGS. 2B and 4) of the outer panel 60 projects from the inner end portion 142 of the main body portion 120. The retainer portion 140 has opposite inner and outer side surfaces 166 and 168. A pair of fastener openings 148 are disposed on an imaginary line 152 between the retainer portion 140 and the inner end portion 142 of the main body portion 170.

The configuration of the retainer portion 140 of the outer panel 60 differs from that of the retainer portion 80 of the inner panel 50. Specifically, the retainer portion 140 of the outer panel 60 has a rectangular configuration including parallel, spaced apart, linear first and second side edges 162 and 164. The side edges 162 and 164 are closer together than are the side edges 112 and 114 of the retainer portion 80 of the inner panel 50. Thus, the retainer portion 140 of the outer panel 60 is narrower than the retainer portion 80 of the inner panel 50. A linear end edge 172 of the retainer portion 140 extends between the side edges 162 and 164.

During assembly of the air bag 30, the inner and outer panels 50 and 60 are placed in an overlying relationship and then sewn together, as described below. As seen in FIG. 3, which shows an initial step in the assembly process, the inner panel 50 overlies the outer panel 60. The main body portion 70 of the inner panel 50 overlies the main body portion 120 of the outer panel 60. The main body portions 70 and 120 define between them an inflation fluid volume 174 of the air bag 30. The inner end portion 96 of the inner panel 50 is coextensive with and overlies the inner end portion 142 of the outer panel 60.

The inner panel 50 is, thereafter, folded about the imaginary line 82 so that the retainer portion 80 of the inner panel (FIG. 4) lies between the inner end portion 96 of the inner panel and the inner end portion 142 of the outer panel 60. The retainer portion 80 of the inner panel 50 projects or extends from the inner end portion 96 of the main body portion 70 of the inner panel in a direction into the inflation fluid volume 174 of the air bag 30. The end edge 116 of the retainer portion 80 of the inner panel 50 is presented toward the lower edge portions 88 and 126 of the panels 50 and 60, respectively.

When the panels 50 and 60 are in the condition shown in FIG. 4, the inner side surface 102 of the retainer portion 80 of the inner panel 50 is presented toward the inner side surface 98 of the inner end portion 96 of the inner panel. The outer side surface 104 of the retainer portion 80 of the inner panel 50 is presented toward the inner side surface 144 of the inner end portion 142 of the outer panel 60. The retainer portion 140 of the outer panel 60 extends from the main body portion 120 of the outer panel, in a direction generally away from the retainer portion 80 of the inner panel 50. A passage 180 is defined between the retainer portion 80 of the inner panel 50 and the inner end portion 142 of the outer panel 60.

The outer panel 60 is next sewn to the inner panel 50, around the outer periphery of the panels. A first part 182a (FIG. 3) of an upper stitching section 182 extends through two layers of material. Specifically, the first part 182a of the upper stitching section 182 extends through the upper edge portion 86 of the main body portion 70 of the inner panel 50 and through the upper edge portion 124 of the main body portion 120 of the outer panel 60. A second part 182b of the upper stitching section 182 extends through three layers of material. Specifically, the second part 182b of the upper stitching section 182 extends through the inner end portion 96 of the inner panel 50, the retainer portion 80 of the inner panel, and the inner end portion 142 of the outer panel 60. The second part 182b of the upper stitching section 182 extends along the side edge 114 of the retainer portion 80 of the inner panel 50.

A second stitching section or lower stitching section 184 is formed as a continuation of the upper stitching section 182. A first part 184a of the lower stitching section 184 extends through two layers of material. Specifically, the first part 184a of the lower stitching section 184 extends through the lower edge portion 88 of the main body portion 70 of the inner panel 50 and through the lower edge portion 126 of the main body portion 120 of the outer panel 60. A second part 184b of the lower stitching section 184 extends through three layers of material. Specifically, the second part 184b of the lower stitching section 184 extends through the inner end portion 96 of the inner panel 50, the retainer portion 80 of the inner panel, and the inner end portion 142 of the outer end panel 60. The second part 184b of the lower stitching section 184 extends along the side edge 112 of the retainer portion 80 of the inner panel 50.

The folding and sewing of the air bag 30, as thus described, results in the formation of a pocket 200 (FIGS. 4–6) in the air bag. The pocket 200 is a partially enclosed chamber or cavity in the air bag 30 which serves as a receptacle or container for the inflator 32 and the diffuser 34. The pocket 200 is located between the retainer portion 80 of the inner panel 50 and the inner end portion 96 of the inner panel. The pocket 200 can be considered to have, or be defined by, one open side and five closed sides.

A first one of the closed sides of the pocket 200 (to the right as viewed in FIGS. 5 and 6) is formed by or defined by the retainer portion 80 of the inner panel 50. A second one of the closed sides of the pocket 200 (to the left as viewed in FIGS. 5 and 6), opposite from the first side, is formed by or defined by the inner end portion 96 of the inner panel 50.

A third one of the closed sides of the pocket 200 (to the top as viewed in FIG. 6), is formed by or defined by the second part 184b of the lower stitching section 184, which extends through the retainer portion 80 of the inner panel 50. A fourth one of the closed sides of the pocket 200 (to the bottom as viewed in FIG. 6), opposite from the third side, is formed by or defined by the second part 182b of the upper stitching section 182, which extends through the retainer portion 80 of the inner panel 50. A fifth one of the closed sides of the pocket 200 (to the bottom as viewed in FIG. 5), is formed by or defined by the portions of the inner panel 50 which are disposed adjacent to the imaginary line 82 about which the inner panel is folded.

The open sixth side of the pocket 200 (to the top as viewed in FIG. 5), is at the area of the end edge 116 of the retainer portion 80 of the inner panel 50. The sixth side of the pocket 200 is open to the inflation fluid volume 174 between the main body portion 70 of the inner panel 50 and the main body portion 120 of the outer panel 60.

The inflator 32, which is secured in the diffuser 34 in a manner not shown, is inserted into the air bag 30, together with the diffuser, in the direction indicated by the arrow 202 (FIG. 4). The inflator 32 and the diffuser 34 are moved through the passage 180 between the outer panel 60 and the retainer portion 80 of the inner panel 50. The assembly of the inflator 32 and the diffuser 34 is then moved in an opposite direction 204, through the open side of the pocket 200, into the pocket. The mounting bolts 40 on the diffuser 34 project through the fastener openings 106 in the inner panel 50.

The retainer portion 140 of the outer panel 60 is then folded along the imaginary line 152 to the position shown in FIG. 5 overlying the inner end portion 96 of the inner panel 50. The inner side surface 166 of the retainer portion 140 of the outer panel 60 overlies the outer side surface 100 of the inner end portion 96 of the inner panel 50. The mounting bolts 40 on the diffuser 34 extend through the fastener openings 148 in the outer panel 60. No separate retaining ring is needed to secure the air bag 30 to the inflator 32.

Lead wires 206 on the inflator 32 are extended out of the air bag 30 through another opening (not shown) in the air bag. The air bag 30 is folded in a known manner (not shown), and the assembled air bag module 10 is enclosed with a suitable wrap or cover (also not shown).

The air bag module 10 is secured by the mounting bolts 40 to the seat frame member 12 in the seatback 18. The module 10 is, preferably, mounted on the seatback 18 so that when the seatback is reclined at an angle of 25° from the vertical and the inflator is actuated, the air bag 30 deploys in a generally forward and upward direction as illustrated in FIG. 1. The air bag module 10 when mounted in the seat 14 is enclosed by the seat covering material of the seat and, possibly, by foam cushion material of the seatback 18.

The vehicle in which the air bag module 10 is mounted includes known means indicated schematically at 208 (FIG. 1) for sensing a side impact to the vehicle and for actuating the inflator 32 in response to the sensing of a side impact. The means 208 may include a side impact sensor, such as a deceleration sensor, and vehicle circuitry for electrically actuating the inflator 32 in response to sensing a side impact to the vehicle greater than a predetermined threshold value for which inflation of the air bag 30 is desired to help protect the vehicle occupant. The means 208 is electrically connected with the inflator 32, via the lead wires 206, for providing an actuation signal to the inflator.

In the event of a side impact to the vehicle of a magnitude greater than the predetermined threshold value, the inflator 32 is actuated by the means 208. Inflation fluid flows out of the inflator 32 and into the diffuser 34. The inflation fluid flows out of the diffuser 34, through the openings 36 in the diffuser, and into the air bag 30 to inflate the air bag. The rapidly flowing inflation fluid causes the inflating air bag 30 to cut through the foam cushion material and the seat covering material of the seatback 18. The air bag 30 inflates from a folded, stored condition to an inflated condition as illustrated in FIG. 1.

The air bag 30 preferably includes a flow control structure illustrated schematically at 230 (FIG. 3), for controlling the timing and duration of inflation of the air bag 30. The flow control structure 230 includes a divider panel 232 which is sewn between the inner and outer panels 50 and 60. The divider panel 232 extends across the width of the air bag 30 between the upper and lower stitching sections 182 and 184. The divider panel 232 divides the inflation fluid volume 174 of the air bag 30 into a lower chamber 174a and an upper chamber 174b. When the air bag 30 is inflated as shown in FIG. 1, the lower chamber 174a is adjacent to the torso of an occupant of the seat 14, and the upper chamber 174b is adjacent to the head of the occupant of the seat 14.

A plurality of openings 234 are formed in the divider panel 232. The openings 234 enable fluid communication between the lower chamber 174a and the upper chamber 174b. The openings 234 are covered by a rectangular valve panel 236. The valve panel 236 is sewn to the divider panel 232, along one side of the valve panel, in a manner so that the valve panel acts as a check valve to block fluid flow from the upper chamber 174b into the lower chamber 174a.

When the air bag 30 is inflating as described above, inflation fluid from the inflator 32 flows first into the lower chamber 174a of the inflation fluid volume 174. The inflation fluid flows through the openings 234 in the divider panel 232 and into the upper chamber 174b. The openings 234 in the divider panel 232 are, preferably, configured to restrict flow of inflation fluid into the upper chamber 174b and, thereby, to delay inflation of the upper chamber 174b in favor of inflation of the lower chamber 174a. The lower chamber 174a is, preferably, inflated first because a side impact to the vehicle typically impacts the occupant's torso before it impacts the occupant's head.

The upper chamber 174b of the air bag 30 then inflates fully to help protect the head of the vehicle occupant. After the upper chamber 174b is inflated, the valve panel 236 is urged by the pressure of the inflation fluid in the upper chamber to a position covering the openings 234 in the divider panel 232. The valve panel 236 blocks fluid flow through the openings 234 in the divider panel 232, in a direction from the upper chamber 174b into the lower chamber 174a. This blockage of fluid flow can help to maintain the upper chamber 174b of the air bag 30 in an inflated condition for a substantial period of time.

From the above description of the invention, those skilled in the art will perceive improvements, changes and modifications in the invention. For example, the air bag may be inverted, prior to inserting the inflator, and the seams of the air bag may be top-stitched in a known manner. Also, one or more tethers (not shown) may be sewn between and extend between the outer panel and the inner panel. Such improvements, changes and modifications within the skill of the art are intended to be covered by the appended claims.

Having described the invention, we claim:

1. A vehicle safety apparatus for helping to protect an occupant of a vehicle seat in the event of a side impact to the vehicle, said apparatus comprising:

an inflatable vehicle occupant protection device having a deflated condition and being inflatable into a position adjacent to the vehicle occupant for helping to protect the vehicle occupant; and an inflator which is actuatable to provide inflation fluid for inflating said inflatable device;

said inflatable device including first and second main body portions and a first retainer portion which is disposed between said first and second main body portions;

said first retainer portion and said first main body portion of said inflatable device at least partially defining a pocket in said inflatable device in which said inflator is disposed.

2. An apparatus as set forth in claim 1 wherein said first retainer portion and said first main body portion are sewn together at spaced apart locations to close at least two sides of said pocket, said first retainer portion extending from an end portion of said first main body portion, said first retainer portion being folded relative to said first main body portion along a first fold line, said first fold line defining one side of said pocket.

3. An apparatus as set forth in claim 1 wherein said pocket is formed of two layers of material which are interconnected along three closed sides of said pocket, said pocket having an open side which opens into an inflation fluid volume of said inflatable device defined between said first and second main body portions of said inflatable device, said two layers of material comprising said first main body portion and said first retainer portion.

4. An apparatus as set forth in claim 3 comprising first and second stitching sections which are spaced apart from each other and which define two of said three closed sides of said pocket, said inflator having an elongate configuration extending between said first and second stitching sections.

5. A vehicle safety apparatus for helping to protect an occupant of a vehicle seat in the event of a side impact to the vehicle, said apparatus comprising:

an inflatable vehicle occupant protection device having a deflated condition and being inflatable into a position adjacent to the vehicle occupant for helping to protect the vehicle occupant;

an inflator which is actuatable to provide inflation fluid for inflating said inflatable device; and means for connecting said inflatable device and said inflator with the vehicle seat;

said inflatable device including first and second main body portions and a first retainer portion which is disposed between said first and second main body portions;

said first retainer portion and said first main body portion of said inflatable device at least partially defining a pocket in said inflatable device in which said inflator is disposed.

6. An apparatus as set forth in claim 5 wherein said first retainer portion and said first main body portion are sewn together at spaced apart locations to close at least two sides of said pocket.

7. An apparatus as set forth in claim 6 wherein said first retainer portion extends from an end portion of said first main body portion, said first retainer portion being folded relative to said first main body portion along a first fold line, said first fold line defining one side of said pocket.

8. An apparatus as set forth in claim 5 wherein said pocket has an open side through which said inflator is inserted into said pocket and has three closed sides, said retainer portion and said first main body portion being joined together along each one of said three closed sides of said pocket.

9. An apparatus as set forth in claim 8 wherein said inflatable device comprises first and second stitching sections which are spaced apart on opposite sides of said pocket, said first and second stitching sections extending through and connecting said first main body portion and said second main body portion and said first retainer portion thereby to close first and second opposite ones of said three closed sides of said pocket.

10. An apparatus as set forth in claim 9 wherein said inflatable device comprises a panel of material including said first main body portion and said first retainer portion and having a first fold line between said first main body portion and said first retainer portion, said first fold line extending between said first and second stitching sections and closing a third one of said three closed sides of said pocket.

11. An apparatus as set forth in claim 5 wherein said pocket is formed of two layers of material which are interconnected along three closed sides of said pocket, said pocket having an open side which opens into an inflation fluid volume of said inflatable device defined between said first and second main body portions of said inflatable device, said two layers of material comprising said first main body portion and said first retainer portion.

12. An apparatus as set forth in claim 11 comprising first and second stitching sections which are spaced apart from each other and which define two of said three closed sides of said pocket, said inflator having an elongate configuration extending between said first and second stitching sections.

13. An apparatus as set forth in claim 5 wherein said first retainer portion overlies said second main body portion when said inflator is disposed in said pocket, said inflatable device further comprising a second retainer portion extending from said second main body portion, said second retainer portion overlying said first main body portion when said inflator is disposed in said pocket.

14. A vehicle safety apparatus for helping to protect a vehicle occupant seated in a vehicle seat in the event of a side impact to the vehicle, said apparatus comprising:

an inflatable vehicle occupant protection device having a deflated condition and being inflatable into a position adjacent to the vehicle occupant for helping to protect the vehicle occupant;

an inflator which is actuatable to provide inflation fluid for inflating said inflatable device; and means for connecting said inflatable device and said inflator with the vehicle seat;

said inflatable device including first and second main body portions, a first retainer portion which extends from an end portion of said first main body portion and which is disposed between said first and second main body portions, and a second retainer portion which extends from an end portion of said second main body portion and which is disposed outside of said first and second main body portions;

said first and second main body portions and said first retainer portion each having respective first and second edge portions;

said inflatable device having a first stitching section which extends through said first edge portions of said first retainer portion and of said first and second main body portions and a second stitching section which extends through said second edge portions of said first retainer portion and of said first and second main body portions;

said inflatable device having a pocket in which said inflator assembly is disposed, said pocket being at least partially defined by said first retainer portion of said panel and by said end portion of said first main body portion and by said first and second stitching sections.

15. An apparatus as set forth in claim 14 wherein said first retainer portion is folded relative to said first main body portion along a first fold line, said first fold line extending between said first and second stitching sections, said first fold line at least partially defining said pocket.

16. An apparatus as set forth in claim 15 wherein said inflator has an elongate configuration extending between said first and second stitching sections, said retainer portions and said main body portions of said inflatable device extending circumferentially around said inflator.

17. An apparatus as set forth in claim 14 wherein said inflatable device comprises first and second panels of fabric material which are sewn together in an overlying relationship to form said inflatable device, said first panel of fabric material including said first main body portion and said first retainer portion, and second panel of fabric material including said second main body portion and said second retainer portion, said first retainer portion being folded inside said first and second main body portions, and second retainer portion being folded around said first main body portion.

18. An apparatus as set forth in claim 17 wherein said means for connecting said inflatable device and said inflator with the vehicle seat comprises a plurality of fasteners which are fixedly connected with said inflator and which extend through fastener openings in said first and second panels of fabric material.

19. An apparatus as set forth in claim 14 wherein said inflatable device defines an inflation fluid volume which comprises a first chamber for, when inflated, helping to protect the torso of the vehicle occupant and a second chamber for, when inflated, helping to protect the head of the vehicle occupant, said inflatable device further comprising flow control means intermediate said first and second chambers for delaying inflation of said second chamber and for helping to maintain said second chamber in an inflated condition.

* * * * *